(12) United States Patent
Kamatsuchi et al.

(10) Patent No.: US 9,505,640 B2
(45) Date of Patent: Nov. 29, 2016

(54) COMPOSITION FOR TREATMENT OF BALLAST WATER

(75) Inventors: Yoshinori Kamatsuchi, Niigata-ken (JP); Takao Miyakoshi, Niigata-ken (JP)

(73) Assignee: Nippon Soda Co., Ltd., Tokyo (JP)

( * ) Notice: Subject to any disclaimer, the term of this patent is extended or adjusted under 35 U.S.C. 154(b) by 100 days.

(21) Appl. No.: 13/509,711

(22) PCT Filed: Nov. 17, 2010

(86) PCT No.: PCT/JP2010/070509
§ 371 (c)(1),
(2), (4) Date: May 14, 2012

(87) PCT Pub. No.: WO2011/062202
PCT Pub. Date: May 26, 2011

(65) Prior Publication Data
US 2013/0020265 A1 Jan. 24, 2013

(30) Foreign Application Priority Data
Nov. 19, 2009  (JP) .................. 2009-264208

(51) Int. Cl.
| B01D 19/00 | (2006.01) |
| C02F 1/70 | (2006.01) |
| C02F 1/76 | (2006.01) |
| C01F 1/00 | (2006.01) |
| C02F 103/00 | (2006.01) |
| C02F 1/467 | (2006.01) |
| C02F 1/68 | (2006.01) |

(52) U.S. Cl.
CPC . *C02F 1/70* (2013.01); *C02F 1/76* (2013.01); *C02F 1/4674* (2013.01); *C02F 1/686* (2013.01); *C02F 1/688* (2013.01); *C02F 2103/008* (2013.01); *C02F 2303/04* (2013.01); *C02F 2303/185* (2013.01)

(58) Field of Classification Search
None
See application file for complete search history.

(56) References Cited

U.S. PATENT DOCUMENTS

| 2,936,289 | A | * | 5/1960 | Harshman et al. | ........... 252/181 |
| 4,043,932 | A | * | 8/1977 | Fresenius et al. | ........... 424/618 |
| 4,816,177 | A | * | 3/1989 | Nelson et al. | ............... 252/181 |
| 5,645,848 | A | * | 7/1997 | De et al. | ...................... 424/408 |
| 5,780,055 | A | * | 7/1998 | Habib et al. | ................. 424/464 |
| 2002/0031547 | A1 | * | 3/2002 | Takagi et al. | ................. 424/464 |
| 2003/0029811 | A1 | | 2/2003 | Russell | |
| 2003/0121464 | A1 | | 7/2003 | O'Reilly et al. | |

(Continued)

FOREIGN PATENT DOCUMENTS

| AU | 2007303658 | 4/2008 |
| EP | 0211294 | 2/1987 |

(Continued)

OTHER PUBLICATIONS

Tablet, Excipient, Binder—Definitions [Collins, Merriam-Webster; accessed Jun. 2013; 4 pages].*

(Continued)

*Primary Examiner* — Bobby Ramdhanie
*Assistant Examiner* — Hayden Brewster
(74) *Attorney, Agent, or Firm* — Andrews Kurth Kenyon LLP

(57) ABSTRACT

The present invention relates to a method for reduce treating ballast water which has been subjected to a biocidal treatment with a chlorine-based oxidizing agent or an oxygen-based oxidizing agent, by using a tablet or pellet of sodium sulfite.

1 Claim, 2 Drawing Sheets

(56) References Cited

U.S. PATENT DOCUMENTS

| | | | |
|---|---|---|---|
| 2003/0141258 A1* | 7/2003 | Hatch | 210/745 |
| 2005/0139805 A1* | 6/2005 | Koster | 252/181 |
| 2005/0155937 A1* | 7/2005 | Zawada et al. | 210/758 |
| 2006/0102874 A1* | 5/2006 | Zheng | 252/182.11 |
| 2007/0042042 A1* | 2/2007 | Jo et al. | 424/468 |
| 2008/0149485 A1 | 6/2008 | Childers et al. | |
| 2009/0068261 A1* | 3/2009 | Reher et al. | 424/463 |
| 2010/0048644 A1* | 2/2010 | Xu et al. | 514/356 |
| 2010/0072144 A1 | 3/2010 | Osakabe et al. | |
| 2010/0140178 A1* | 6/2010 | Thimmesch et al. | 210/670 |

FOREIGN PATENT DOCUMENTS

| | | |
|---|---|---|
| JP | 03-024191 A | 2/1991 |
| JP | 03-161091 | 7/1991 |
| JP | 07-100473 | 4/1995 |
| JP | 07-277704 A | 10/1995 |
| JP | 09-188503 A | 7/1997 |
| JP | 09-206757 | 8/1997 |
| JP | 10-000483 | 1/1998 |
| JP | 2001-065021 | 3/2001 |
| JP | 2001-104968 A | 4/2001 |
| JP | 2001-286874 A | 10/2001 |
| JP | 2002-266401 | 9/2002 |
| JP | 2005-506179 | 3/2005 |
| JP | 2007-144391 | 6/2007 |
| JP | 2008/222756 A | 9/2008 |
| JP | 2009-028569 | 2/2009 |
| WO | 9414479 | 7/1994 | |
| WO | WO 9842310 A2 * | 10/1998 | A61K 9/00 |
| WO | WO 0210327 A1 * | 2/2002 | C11D 3/40 |

OTHER PUBLICATIONS

How to Convert Ksi to Mpa_eHow [Jun. 28, 2012; 1 page].*
Substantially—Definition [Merriam; accessed Jun. 2013; 2 pages].*
Weiner et al.—Excipient Toxicity and Safety [2000; 374 pages].*
thefreedictionary.com—excipient—definition [accessed Mar. 20, 2014; 2 pages].*
Sodium Sulfite MSDS [ScienceLab.com; Oct. 2005; 6 pages].*
International Search Report issued for PCT/JP2010/070509, dated Feb. 22, 2011, 2 pages.
Office Action issued in JP Appln. No. 2011-541938, dated Nov. 19, 2013, 10 pages (with English translation).
EP Communication with Supplementary European Search Report issued in EP Application No. 10831596.1, dated Feb. 2, 2015, 7 pages.

* cited by examiner

COMPOSITION FOR TREATMENT OF BALLAST WATER

TECHNICAL FIELD

The present invention relates to a safer and simpler reduction treatment method for ballast water.

BACKGROUND ART

Ballast water means seawater carried as a weight for securing a draught to stabilize a ship, mainly when the ship is loaded with no cargo. When the ship is loaded with cargo, the cargo itself acts as a weight to stabilize a hull of the ship. However, when it is unloaded, the hull of the ship floats to decrease stability. Accordingly, a substantial amount of seawater is carried in a ballast tank after discharge of the cargo.

When the seawater is introduced into the ships as the ballast water for the ships, aquatic organisms are also introduced together. The aquatic organisms introduced are transported to distant regions with navigation of the ships. Then, the organisms are poured out to places different from their original habitat due to discharge of the ballast water. There is a possibility that the alien organisms thus poured out take root and bleed in the places different from their original habitat to cause disruption of ecosystem in such sea areas, damage to economic activities such as the fisheries industry, coast pollution and the like (see Non-Patent Document 1).

From such situations, it has been proposed to kill the alien organisms by adding biocidal agents such as sodium hypochlorite, aldehydes and alkynes to the ballast water introduced into the ships, as described in Patent Documents 1 to 3.

However, when the ballast water to which the biocidal agents have been added is discharged in large amounts, there is a possibility that native organisms in the sea areas to which the water has been discharged are killed. Accordingly, it has been proposed to render the ballast water harmless by adding reducing agents such as sodium sulfite and hydrogen or neutralizing agents such as amines, amino acids and amino alcohols thereto, before or at the time when the ballast water to which the biocidal agents have been added is discharged.

RELATED ART

Patent Documents

Patent Document 1: US 2003/0029811
Patent Document 2: JP-T-2005-506179
Patent Document 3: US 2003/121464

Non-Patent Document

Non-Patent Document 1: Ministry of Land, Infrastructure, Transport and Tourism, Policy Bureau, Ocean Policy Division, "The efforts of Ministry of Land, Infrastructure, Transport and Tourism over the International Convention for the Control and Management of Ships' Ballast Water and Sediments", Nippon Suisan Gakkaishi 73 (6), 1150-1154 (2007)

DISCLOSURE OF THE INVENTION

Problems that the Invention is to Solve

By the way, sodium sulfite is a white powder which is difficult to be tableted. In the work of adding the sodium sulfite powder to the ballast water, the powder goes up in the air. Accordingly, it is inhaled, adheres to the skin, or gets in the eye in some cases, which causes a concern about an influence thereof on human health.

An object of the present invention is therefore to provide a safer and simpler reduction treatment method for ballast water.

Means for Solving the Problems

In order to attain the above-mentioned object, the present inventors have made intensive studies. As a result, it has been found that a reduction treatment of ballast water can be performed more safely and simply by press molding white powdered sodium sulfite together with sodium chloride or the like as an excipient to form a tablet or pellet, and bringing the tablet or pellet into contact with the ballast water which has been subjected to a biocidal treatment. The present invention has been completed by further studied based on this finding.

That is, the present invention provides a method for reduce treating ballast water which has been subjected to a biocidal treatment with a chlorine-based oxidizing agent or an oxygen-based oxidizing agent, by using a tablet or pellet of sodium sulfite.

In the method for reduce treating ballast water according to the present invention, it is preferred to comprise bringing the ballast water which has been subjected to the biocidal treatment into contact with the tablet or pellet of sodium sulfite.

In the method for reduce treating ballast water according to the present invention, it is also preferred to comprise dissolving or suspending the tablet or pellet of sodium sulfite in water, and adding the resulting aqueous solution or suspension to the ballast water which has been subjected to the biocidal treatment.

In the method for reduce treating ballast water according to the present invention, it is also preferred to comprise filling a container with the tablet or pellet of sodium sulfite, and allowing the ballast water which has been subjected to the biocidal treatment to pass through an inner cavity of the container, thereby bringing it into contact with the tablet or pellet of sodium sulfite.

In the method for reduce treating ballast water according to the present invention, it is preferred that the ballast water which has been subjected to the biocidal treatment with the chlorine-based oxidizing agent is one obtained by electrolysis of a ballast water.

The present invention also provides a tablet or pellet comprising sodium sulfite and an excipient.

In the tablet or pellet according to the present invention, it is preferred that the excipient comprises sodium chloride.

In the tablet or pellet according to the present invention, it is preferred that the excipient is substantially composed of sodium chloride.

In the tablet or pellet according to the present invention, it is preferred that a weight ratio of sodium sulfite to the excipient is from 40/60 to 60/40.

The tablet or pellet according to the present invention is preferably a tablet or pellet obtained by press molding a mixture of sodium sulfite and the excipient, in which tableting pressure at the time of press molding is from 5 to 50 MPa.

The tablet or pellet according to the present invention is preferably a tablet or pellet obtained by press molding a mixture of sodium sulfite and the excipient, in which tableting pressure at the time of press molding is from 10 to 30 MPa.

Advantages of the Invention

According to the reduction treatment method according to the present invention, in the work of adding a reducing agent to ballast water after subjected to a biocidal treatment with a chlorine-based substance, an oxygen-based oxidizing agent or the like, it rarely occurs that sodium sulfite is inhaled, adheres to the skin or gets in the eye, and the influence of concern on health is reduced. Further, the reduction treatment can be simply performed by filling the tablet or pellet of sodium sulfite in a container, and allowing the ballast water after subjected to the biocidal treatment with the chlorine-based substance, the oxygen-based oxidizing agent or the like to pass through it.

Sodium sulfite is a powder which is difficult to be tableted, so that it is difficult to be tablet-molded alone. In particular, it is difficult to be molded into a large-sized tablet. The tablet or pellet according to the present invention is obtained by press molding white powdered sodium sulfite which is difficult to be tableted, together with sodium chloride or the like. According to the present invention, a large-sized tablet or pellet containing sodium sulfite can be formed. Further, even when the ballast water to which the tablet or pellet according to the present invention has been added is discharged in sea areas in large amounts, the influence thereof on the environment is low. It is therefore safe.

MODE FOR CARRYING OUT THE INVENTION

Figure 1:
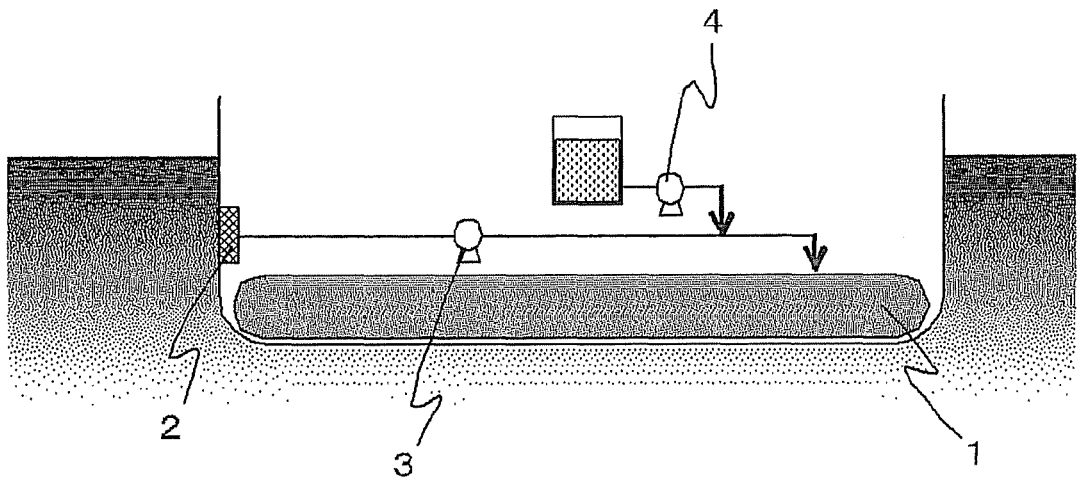
FIG. 1 is a view showing one example of a state where seawater is poured into a ballast tank in unloading cargo from a ship.

The method according to the present invention is a method of reduce treating ballast water which has been subjected to a biocidal treatment with a chlorine-based oxidizing agent, an oxygen-based oxidizing agent or the like, by using a tablet or pellet of sodium sulfite.

Examples of the chlorine-based oxidizing agents used in the biocidal treatment include agents including chloric acids such as hypochlorous acid, chlorous acid and perchloric acid, and water-soluble salts thereof; ones prepared by introducing chlorine gas into a sodium hydroxide solution and the like; and hypochlorous acid derivatives obtained by electrolyzing seawater.

Examples of the oxygen-based oxidizing agents include ozone, hydrogen peroxide, and percarbonates and persulfates which are dissolved in water to generate hydrogen peroxide.

Further, ballast water is directly electrolyzed to produce sodium hypochlorite in the ballast water, thereby being able to obtain a biocidal effect equivalent to that of the case where a sodium hypochlorite-containing oxidizing agent is added to the ballast water. The ballast water which has been subjected to the biocidal treatment with the chlorine-based oxidizing agent in the present invention is meant to contain such one obtained by the electrolysis.

Incidentally, hydrogen generated as a by-product by the electrolysis of seawater is allowed to be absorbed and stored by a hydrogen storing alloy or the like, and this hydrogen can be utilized in electric power generation and the like. Further, the electricity used for the electrolysis can be generated by solar power generation or the like. Energy efficiency is significantly increased by using the system in which the electric power generation, the ballast water treatment by the electrolysis and the hydrogen storing are combined like this.

The tablet or pellet of sodium sulfite can be obtained by mixing sodium sulfite and an excipient, and press molding the resulting mixture.

As the excipient, there can be used lactose, starch, dextrin, saccharose, cellulose, and the like. In the present invention, sodium chloride having no possibility of marine pollution is preferred. The excipient may be used either alone or as a mixture of two or more thereof. When two or more thereof are used as a mixture, it is preferred that the excipient contains sodium chloride, and it is more preferred that the excipient is substantially composed of sodium chloride. Incidentally, in this specification, "the excipient is substantially composed of sodium chloride" means that the excipient does not contain components other than sodium chloride to such an extent that they have an influence on the effects of the present invention.

Mixing of sodium sulfite and the excipient can be performed by a known method. Although the weight ratio of sodium sulfite to the excipient is not particularly limited, it is usually from 20/80 to 95/5, preferably from 30/70 to 80/20, and more preferably from 40/60 to 60/40, in terms of the mass ratio of sodium sulfite/excipient. When the amount of the excipient is too small, it tends to become difficult to mold the tablet or pellet. On the other hand, when the amount of the excipient is too large, a reduction effect to the amount of tablet or pellet which comes into contact with the ballast water tends to decrease.

A known tableting apparatus can be used for the press molding. Although the tableting pressure is not particularly limited, it is usually from 5 to 50 MPa, and preferably from 10 to 30 MPa, in gauge pressure. When the tableting pressure is within this range, the tablet or pellet is not collapsed during storage, and when it comes into contact with the ballast water, an appropriate amount thereof comes to be dissolved.

The tablet or pellet of sodium sulfite is not particularly limited by their shape. For example, there are a disk shape, a rectangular parallelepiped shape, a cylindrical shape and the like. The size thereof is also not particularly limited. For example, the cylindrical tablet may have a diameter of 50 to 70 mm and a height of 25 to 35 mm.

In the present invention, the reduction treatment can be performed, for example, by bringing the ballast water which has been subjected to the biocidal treatment into contact with the tablet or pellet of sodium sulfite, or by dissolving or suspending the tablet or pellet of sodium sulfite in water and adding the resulting aqueous solution or suspension to the ballast water which has been subjected to the biocidal treatment.

Although the amount of sodium sulfite used in the reduction treatment is not particularly limited, it can be appropriately selected depending on the amount of the chlorine-based oxidizing agent remaining in the ballast water. Usually, the amount of sodium sulfite added is adjusted preferably to 1.7 to 3 times, and more preferably to twice, based on the effective concentration of remaining chlorine.

In the case where the ballast water which has been subjected to the biocidal treatment is brought into contact with the tablet or pellet of sodium sulfite, the ballast water may be brought into contact with the tablet or pellet by adding the tablet or pellet thereto. However, in the present invention, a method of allowing the ballast water to pass through a container filled with the tablet or pellet, thereby bringing it into contact therewith is preferred.

The method for allowing the ballast water to pass through the container is not particularly limited. For example, in the container having at least two openings, the ballast water may be allowed to flow in through one opening and discharged from the other opening; or in the container having one opening, the ballast water may be allowed to flow in through the opening, and discharged after the ballast water has been filled. In the present invention, the former method is effective and preferred.

The structure of the container is not particularly limited. Examples thereof include packed towers or packed tanks used in chemical industries and the like; and agent dissolvers described in JP-T-4-500171, JP-T-6-501418, JP-B-59-13890, JP-A-8-155465 and the like.

FIG. 1 is a view showing a state where seawater is poured into a ballast tank in unloading cargo from a ship.

In unloading cargo, in order to stabilize the ship, seawater is introduced as a weight from the ocean through a filter 2 by means of a ballast pump 3 to store it in a ballast tank 1. At this time, in order to kill organisms concealed in the seawater introduced, a sodium hypochlorite-containing oxidizing agent is in-line blended thereto by means of an oxidizing agent pump 4. Incidentally, the sodium hypochlorite-containing oxidizing agent can be produced by electrolysis of seawater. Further, instead of in-line blending the sodium hypochlorite-containing oxidizing agent by the pump 4, sodium hypochlorite can also be produced in the ballast water by directly electrolyzing the ballast water.

Figure 2:
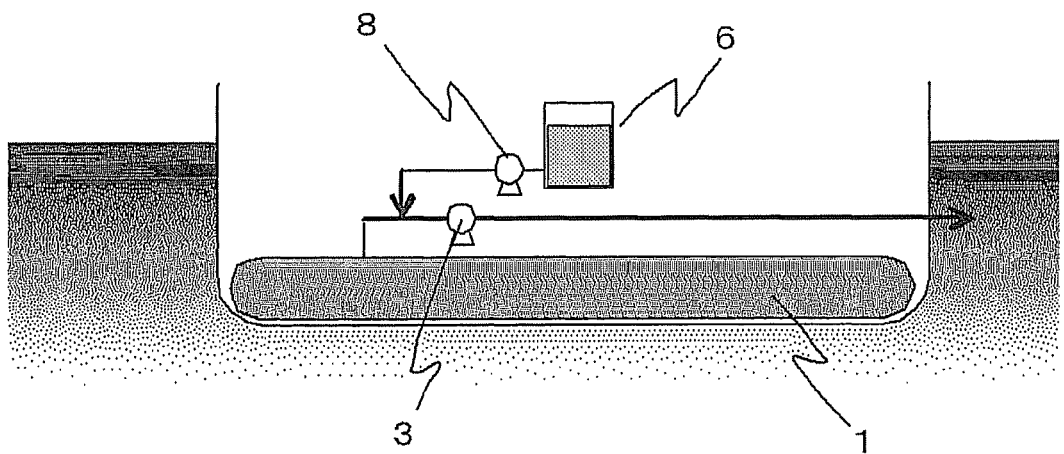
FIG. 2 is a view showing one example of a state where seawater is discharged from a ballast tank in loading cargo on a ship.
Figure 3:
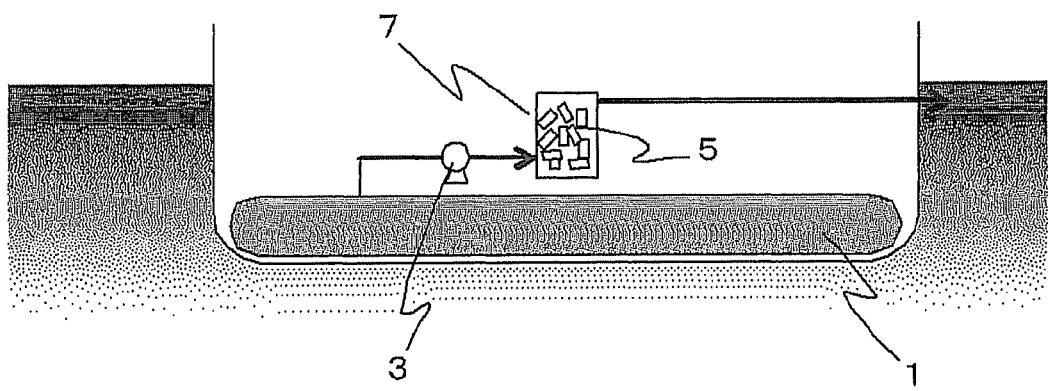
FIG. 3 is a view showing another example of a state where seawater is discharged from a ballast tank in loading cargo on a ship.

FIGS. 2 and 3 are each a view showing a state where seawater is discharged from a ballast tank in loading cargo on a ship.

In loading cargo, the cargo acts as a weight, so that the ballast water becomes unnecessary. The ballast water is discharged from the ballast tank 1 by using the ballast pump 3.

At this time, in FIG. 2, a liquid in which the tablet or pellet of sodium sulfite is dissolved or suspended is in-line blended with the ballast water from an agent tank 6 for storing the liquid, by using a reducing agent pump 8, and that is discharged to the ocean.

In FIG. 3, the ballast water is allowed to flow in a bottom portion of a tower 7 filled with the tablet or pellet 5 of sodium sulfite, thereby bringing the ballast water into contact with the tablet or pellet 5, and discharged from a top portion of the tower to the ocean.

In this way, the alien organisms in the ballast water are killed in unloading cargo, and the oxidizing agent in the ballast water is subjected to the reduction treatment in loading cargo, whereby native organisms in places where the ballast water is discharged can be prevented from being killed.

EXAMPLES

The present invention will be described more specifically below showing examples. Incidentally, the scope of the present invention should not be construed as being limited by these examples.

Example 1

Into a container fixing type mixer, 60 parts by weight of a white powder of anhydrous sodium sulfite and 40 parts by weight of sodium chloride were charged and stirred with a stirring blade to thoroughly mix them. The resulting mixture was tableted by a pelletizer at a tableting pressure of 25 MPa to obtain cylindrical pellets having a diameter of 50 mm and a length of 30 mm. The breaking strength was 960 N.

Comparative Example

It was attempted to tablet 100 parts by weight of a white powder of anhydrous sodium sulfite with the pelletizer by the same technique as in Example 1. However, the powder was not sufficiently solidified, and only brittle lumps having a breaking strength of 150 N or less were obtained.

Example 2

A mixture A containing 100 parts by weight of a white powder of anhydrous sodium sulfite, a mixture B containing 90 parts by weight of a white powder of anhydrous sodium sulfite and 10 parts by weight of sodium chloride, a mixture C containing 80 parts by weight of a white powder of anhydrous sodium sulfite and 20 parts by weight of sodium chloride, a mixture D containing 70 parts by weight of a white powder of anhydrous sodium sulfite and 30 parts by weight of sodium chloride, a mixture E containing 60 parts by weight of a white powder of anhydrous sodium sulfite and 40 parts by weight of sodium chloride, and a mixture F containing 50 parts by weight of a white powder of anhydrous sodium sulfite and 50 parts by weight of sodium chloride were each prepared. The mixtures A to F were tableted by a pelletizer at a tableting pressure of 25 MPa to obtain cylindrical solids having a diameter of 50 mm and a length of 30 mm. The results of observation of tableted states of the resulting solids are shown in Table 1.

TABLE 1

|  | Mixture A | Mixture B | Mixture C | Mixture D | Mixture E | Mixture F |
| --- | --- | --- | --- | --- | --- | --- |
| Sodium Sulfite | 100% | 90% | 80% | 70% | 60% | 50% |
| Common Salt | 0% | 10% | 20% | 30% | 40% | 50% |
| Tableted State | B | B | B | B | A | A |

B: Brittle lumps were obtained.
A: Tablets with strength were obtained.

Example 3

Figure 4:
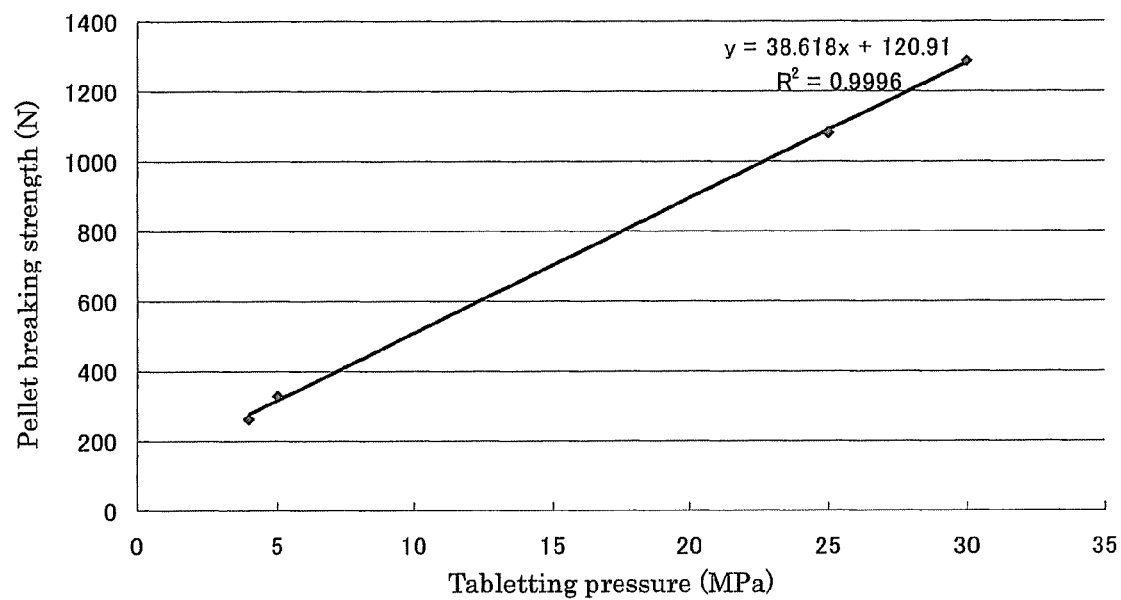
FIG. 4 is a graph showing the relationship between a tableting pressure and a braking strength in Example 3.

Into a container fixing type mixer, 50 parts by weight of a white powder of anhydrous sodium sulfite and 50 parts by weight of sodium chloride were charged, and stirred with a stirring blade to thoroughly mix them. The resulting mixture was tableted by a pelletizer (manufactured by Machina Co., Ltd.) at tableting pressures of 4 MPa, 5 MPa, 25 MPa, and 30 MPa to obtain cylindrical pellets a to d having a diameter of 50 mm and a length of 30 mm. The tableting pressure as described herein means the hydraulic gauge pressure of the above-mentioned tableting machine. The breaking strength (N) of the resulting pellets a to d was measured by SJ-50 (manufactured by Marubishi Science Machine Manufacturing Co., Ltd.). The results thereof are shown in Table 2. Incidentally, the breaking strength (N) is shown as maximum force at the time when the tablet put between flat plates is broken by compression. Further, the relationship between the tableting pressure and the breaking strength is shown in FIG. 4.

Incidentally, when the breaking strength (N) becomes about 300 N or less, the tablet is easily broken by hand, resulting in being unsuitable for practical use.

TABLE 2

|  | Pellet a | Pellet b | Pellet c | Pellet d |
| --- | --- | --- | --- | --- |
| Tableting Pressure (MPa) | 4 | 5 | 25 | 30 |
| Breaking Strength (N) | 263 | 327 | 1080 | 1283 |

Although the present invention has been described in detail with reference to specific embodiments, it will be apparent to those skilled in the art that various modifications and changes can be made without departing from the spirit and scope of the present invention.

This application is based on Japanese Patent Application No. 2009-264208, filed on Nov. 19, 2009, the content of which is incorporated herein by reference.

The invention claimed is:

1. A tablet or pellet consisting of sodium sulfite and sodium chloride wherein the weight ratio of sodium sulfite to sodium chloride is from 40/60 to 60/40.

* * * * *